W. F. LONG.
Churns.
No. 196,029. Patented Oct. 9, 1877.
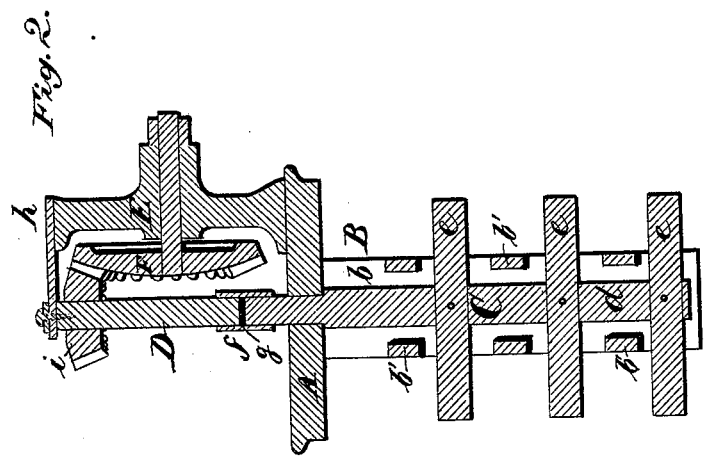
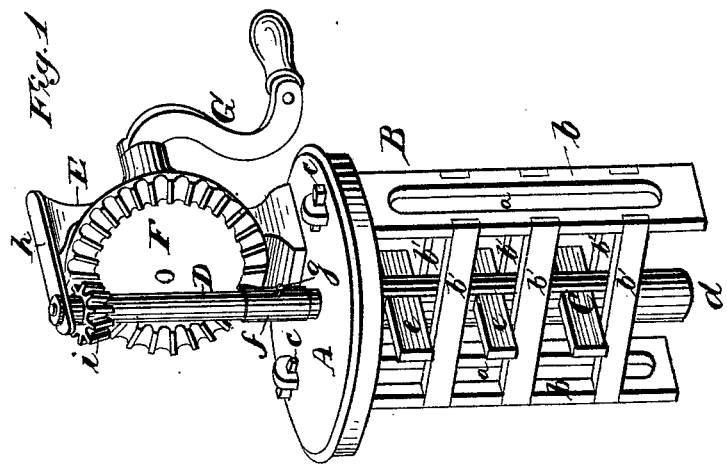

UNITED STATES PATENT OFFICE.

WILLIAM F. LONG, OF RICEVILLE, TENNESSEE, ASSIGNOR TO HIMSELF, MANUEL PARKISON, AND JAS. A. PARKISON, OF SAME PLACE.

IMPROVEMENT IN CHURNS.

Specification forming part of Letters Patent No. 196,029, dated October 9, 1877; application filed August 28, 1877.

*To all whom it may concern:*

Be it known that I, WILLIAM F. LONG, of Riceville, in the county of McMinn and State of Tennessee, have invented certain new and useful Improvements in Churns; and I do hereby declare that the following is a full, clear, and exact description thereof, which will enable others skilled in the art to which it appertains to make and use the same, reference being had to the accompanying drawings, which form a part of this specification, and in which—

Figure 1 is a perspective view of my improved churn-dasher, and Fig. 2 is a vertical section.

Similar letters of reference indicate corresponding parts in both figures.

My invention relates to certain improvements in churns; and the object is to produce a dasher by which the cream may be thoroughly stirred and beaten, so as to produce butter in a very short time, substantially as hereinafter more fully shown and described.

Referring to the drawings hereto annexed, the letter A represents the cover of the churn. B is a frame, consisting of two side pieces, $b\ b$, having vertical slots $a\ a$, and united by cross-pieces $b'\ b'$. This frame is secured to the under side of the cover, it being held in place by keys $c\ c$, which may be removed, so as to permit the frame being detached.

C is the dasher. This consists of a staff, $d$, having cross-pieces or beaters $e\ e$, which are so arranged as to pass between the cross-pieces of frame B when the staff is rotated. The staff passes through a central perforation or bearing in cover A, above which it is coupled, by a sleeve, $f$, and pin $g$, to a shaft, D, having its upper bearing in a bracket, $h$, projecting laterally from an upright, E, secured upon the side of the cover.

Shaft D has at the upper end a pinion, $i$, engaging with a gear-wheel, F, the shaft of which is boxed in upright E, and is provided with a crank, G, by which it may be revolved.

From the foregoing description, and by reference to the drawings hereto annexed, the operation of my invention and its advantages will be readily understood.

When the crank G is turned, the gear-wheel F, meshing with pinion $i$, turns the shaft D, and with it the dasher C, which, as above stated, is coupled thereto. The cross-pieces or beaters $e\ e$ of the dasher stir the cream, and force it between the cross-pieces $b'\ b'$ of frame B, and through the slots $a\ a$ in the side pieces thereof. The cream is thus thoroughly "cut," and the butter caused to come in less time and with less labor than in a churn of the ordinary construction.

When the operation of churning has been finished, the dasher may be uncoupled from the shaft D and removed. The frame B may also be detached from the cover simply by removing the keys which hold it in place. This is for the purpose of facilitating the cleaning of the various parts, which then, after drying, are again put together for future use.

My improved churn cover and dasher, which may be used with an ordinary churn-barrel or earthen jar, may be constructed at a small cost. It is simple, durable, and easily operated.

Having thus described my invention, I claim and desire to secure by Letters Patent of the United States—

The cover A, having detachable frame B and upright E, shaft D, having pinion $i$, gear-wheel F, and detachable dasher C, all constructed, combined, and operating, substantially as and for the purpose herein shown and specified.

In testimony that I claim the foregoing as my own I hereto affix my signature in presence of two witnesses.

WILLIAM F. LONG.

Witnesses:
EDWARD A. DODSON,
JAMES M. EMERSON.